United States Patent Office 3,598,812
Patented Aug. 10, 1971

3,598,812
5-NITROFURYL DERIVATIVES
William Hoyle, Bramhall, and Gordon Peter Roberts, Altrincham, England, assignors to Ciba-Geigy Corporation, Ardsley, N.Y.
No Drawing. Filed Dec. 16, 1968, Ser. No. 784,241
Claims priority, application Great Britain, Sept. 12, 1968, 43,374/68
Int. Cl. C07d 5/30
U.S. Cl. 260—240        3 Claims

ABSTRACT OF THE DISCLOSURE 5-nitro-2-furfurylideneamino-oxazolidinones are useful antimicrobial agents; compositions containing these compounds and methods for the treatment of microbial infections, particularly of urinary tract infections, and for the protection of organic material susceptible to microbial attack, employing these compounds; an illustrative embodiment is 5-methylsulphonyloxymethyl-3-(5-nitrofurfurylideneamino)-2-oxazolidinone.

DETAILED DISCLOSURE

The present invention relates to nitrofurfuryl derivatives having valuable pharmacological properties and in particular to 5-nitro-2-furfurylideneamino-oxazolidinone exhibiting antimicrobial activity. It further relates to compositions containing these compounds, as well as to methods for the treatment of mammals, suffering from microbial infections, particularly of urinary tract infections, by administering to said mammals an effective amount of a compound according to the invention. The invention also provides methods for protecting organic material susceptible to microbial attack by treating said material with an effective amount of a compound according to the invention.

According to the present invention there is provided a 5-nitro-2-furfurylideneamino-oxazolidinone having the formula

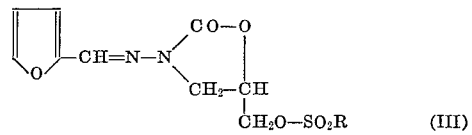

wherein R represents an alkyl group containing from one to five carbon atoms.

The group R may be, for example, methyl, ethyl, n-propyl, isopropyl, n-butyl, isobutyl, secondary butyl, tertiary butyl, n-pentyl or isopentyl.

Preferred members of the compounds of Formula I are 5-methylsulphonyloxymethyl-3-(5-nitrofurfurylideneamino)-2-oxazolidinone and 5-pentylsulphonyloxymethyl-3-(5-nitrofurfurylideneamino)-2-oxazolidinone.

The compounds of Formula I are prepared by reacting 5-hydroxy-methyl-3-(5-nitrofurfurylideneamino)-2-oxazolidinone having the formula

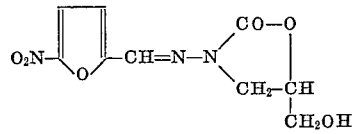

with the corresponding sulphonylating compound containing the structure —$SO_2R$, wherein R has the previous significance.

The sulphonylating compound used in the process of the invention may be, for example, a sulphonic acid or sulphonyl chloride. The process may be carried out by heating the reactants together, if desired in the presence of a basic condensing agent or a dehydrating agent.

Examples of condensing agents which may be used include trimethylamine, triethylamine, pyridine, dimethylaniline and other tertiary organic bases. The starting material represented by the compound of Formula II is described in British patent specification 735,136.

The present invention also provides a second process of producing a 5-nitro-2-furfurylideneamino-oxazolidinone of Formula I, which comprises nitrating the corresponding oxazolidinone compound having the formula:

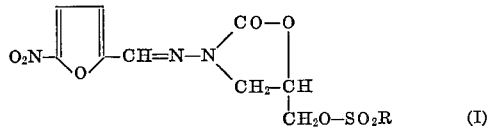

wherein R has the previous significance.

The nitration may be carried out with nitric acid under conditions conventional in nitrating substituted furyl derivatives, for instance, by reacting in the presence of a water-binding agent; the water-binding agent may be, for example, sulphuric acid, but is preferably acetic anhydride. If desired, a proportion of acetic acid may be present in the reaction mixture. The nitration is preferably carried out at a temperature not exceeding 15° C. using concentrated or fuming nitric acid. The reaction may be carried out, for instance, by adding a mixture of concentrated or fuming nitric acid, acetic acid and acetic anhydride slowly to a suspension or solution of the oxazolidinone of Formula III in a mixture of acetic acid and acetic anhydride while maintaining the temperature at from 5° to 15° C., preferably about 10° C.

The compounds of the present invention having Formula I have valuable antimicrobial properties, and in particular having antibacterial, anthelmintic, coccidiostatic, trypanocidal and antimalarial activity of value in human or veterinary medicine. The compounds are particularly valuable in the treatment of infections of the intestinal and urinary tracts. The compounds may also be used to protect a high molecular weight hydrophobic or other organic material susceptible to bacterial or other microbial deterioration by contacting the organic material with, impregnating in or otherwise treating with, the compounds. The compounds also find application as growth-promoting additives to animal feedstuffs.

The antimicrobial activity of the compounds of the invention can be demonstrated in various microbiological tests.

As a first example of the use of the compounds of Formula I, the inhibition of growth of *Escheria coli* NCTC 86, *Salmonella typhi* NCTC 8384 and *Staphylococcus*

*aureus* NCTC 7447 by 5-methylsulphonyloxymethyl-3-5-nitrofurfurylideneamino)-2-oxazolidinone may be described. The test is one described by A. Bruhin and X. Bühlmann, Path. Microbiol. 26, 108–123 (1963).

The test compound was applied to sterile rectangular strips of filter paper having a size of 5 x 85 mm. by dipping these strips into a 1% solution of the test compound in dimethylformamide and allowing them to dry at room temperature. Each strip absorbed about 0.1 ml. of the test solution. The dry filter strips were placed on the surface of a Mueller-Hinton agar culture medium, which is free from p-aminobenzoic acid, in petri dishes. The test compound was allowed to diffuse into the agar medium during 16 hours at 37°. The bacterial suspensions were deposited by means of a platinum inoculation loop onto the agar culture medium in form of a straight line starting at opposite edges of the filter paper strip and extending from the latter at a right angle. The bacterial suspensions (in physiological sodium chloride solution) had a nephelometric density of $\frac{1}{10}$ of a McFarland No. 1 unit. The cultures were then incubated for 24 hours at 37°, whereupon the extension of the inhibition zone is measured. The inhibition zone is constituted by the bacteria-free zone of the inoculation line extending on both sides of the filter paper strip and includes the width of the strip. The width of this bacteria-free zone demonstrated that the test compound has an excellent growth inhibiting effect on above-named bacteria.

As a second example of the use of the compounds of the present invention, the use of 5-(methylsulphonyloxy-methyl)-3-(5-nitrofurfurylideneamino) - 2 - oxazolidinone in experimental cystopyelitis in rats will be described. The test used is in essence that described by G. Marca, M. Preti and D. Della Bella, Boll. Chimicofarm 105, 313–317 (1966).

Rats were infected with *Proteus mirabilis* K 564 by introducing a stainless steel cylinder having an inner volume of about 1.56 mm.³ filled with a suspension of the bacteria of McFarland 1 into the urinary bladder. 5-(2-acetoxyethoxymethyl) - 3 - (5 - nitrofurfurylideneamino) - 2-oxazolidinone is administered orally through an esophagal sound in an amount of five times 50 mg./kg. (suspended in carboxymethylcellulose) according to the following time table:

(1) 4 hours after infection
(2) morning of the first day after infection
(3) evening of the first day after infection
(4) morning of the second day after infection
(5) evening of the second day after infection.

On the third day, the animals were sacrificed, the steel cylinder taken out under sterile conditions and the number of germs determined and compared with controls having been infected in the same manner, but not having obtained the test compound. A very pronounced reduction of germs was observed in the test group.

The toxicity of the compounds of Formula I on oral application is of favorable low order.

For their intended internal use, for example for the treatment or urinary tract infections, the compounds of the invention are administered orally in daily dosages of from about 1 to about 100 mg./kg., preferably from about 1 to about 40 mg/kg. Advantageously, the compounds are administered in form of compositions with a pharmaceutical carrier.

Accordingly, the invention also provides a therapeutic composition comprising an antimicrobially effective proportion of a 5-nitro-2-furfurylideneamino-oxazolidinone of Formula I and a pharmaceutically acceptable solid carrier or liquid diluent.

The pharmaceutical compositions according to the invention contain at least one compound of general Formula I as active substance, together with a conventional pharmaceutical carrier. The type of carrier actually used depends to a great extent on the intended application; for external use, for example in disinfecting healthy skin, disinfecting wounds and in treating dermatoses and infections of the mucous membranes caused by bacteria, ointments, powders and tinctures are used in particular. The ointment bases may be anhydrous, for instance they can consist of mixtures of wool fat and soft paraffin, or they can consist of aqueous emulsions in which the active substance is suspended. Suitable carriers for powders are, for instance rice starch and other starches; the bulk weight of the carriers may be made lighter, if desired, for example by adding highly dispersed silicic acid, or may be made heavier by adding talcum. The tinctures may contain at least one active ingredient of the Formula I in aqueous ethanol, in particular 45% to 75% ethanol, to which 10% to 20% of glycerol may be added, if desired. Solutions prepared from polyethylene glycol and other conventional solubility promoters, and also optionally, from emulsifying agents, may be used with particular advantage in disinfecting healthy skin. The content of active ingredient in pharmaceutical compositions for external application is preferably in the range of from 0.1% to 5%.

Gargles or concentrates for their preparation, and tablets for slow dissolution in the mouth, are suitable for the disinfection of the mouth and throat. The former are preferably prepared from alcoholic solutions containing 1% to 5% of active substance to which glycerol or flavourings may be added. Lozenges, that is solid dosage units, preferably have a relatively high content of sugar or similar substances and a relatively low content of active substance, for instance 0.2% to 20% by weight, as well as the usual conventional additives such as binding agents and flavourings.

Solid dosage units, in particular tablets, dragees (sugar coated tablets) and capsules, are convenient for use in intestinal disinfection and for the oral treatment of urinary tract infections. These units preferably contain from 10% to 90% of the compound of the Formula I to enable the administration of daily doses of from 0.1 to 2.5 grams to adults, or of suitably reduced doses to children. Tablets and dragée cores are produced by combining the compounds of the Formula I with solid, pulverulent carriers such as lactose, saccharose, sorbitol, maize starch, potato starch or amylopectin, cellulose derivatives or gelatins, preferably with the addition of lubricants such as magnesium or calcium stearate or polyethylene glycols of suitable molecular weight. Dragée cores may then be coated, for example with concentrated sugar solutions which can also contain gum arabic, talcum and/or titanium dioxide, or they may be coated with a lacquer dissolved in volatile organic solvents or mixture of solvents. Dyestuffs can be added to these coatings, for instance to differentiate between varying dosages. Soft gelatine capsules and other closed capsules consist, for example, of a mixture of gelatines and glycerol and may contain, for example, mixtures of a compound of Formula I with polyethylene glycol. Hard gelatine capsules contain, for example, granulates of an active substance with solid pulverulent carriers, for instance lactose, saccharose, sorbital, mannitol, starches (such as potato starch, maize starch or amylopectin), cellulose derivatives of gelatines, and magnesium stearate or stearic acid.

In all forms for administration compounds of the Formula I can be present as sole active ingredients or they can also be combined with other known pharmacologically active, and especially antibacterial and/or antimyotically or other antimicrobially active substances, for example to broaden the range of application. They can be combined for example, with 5,7-dichloro-2-methyl-8-quinolinol or other derivatives of 8-quinolinol, with sulfamerizine or sulfafurazole or other derivatives of sulfanilamide, with chloramphenicol or tetracycline or other antibiotics, with 3,4',5-tribromosalicylanide or other halogenated salicylanilides, with halogenated carbamilides, with halogenated benzoxazoles or benzoxazolones, with polychlorohydroxy-diphenylmethanes, with halogen-dihydroxy-diphenyl sulphides, with 4,4'-dichloro-2-hydroxy-diphenylether or 2',4,4'-trichloro - 2 - hydroxydiphenylether or other polyhalogenhydroxydiphenylethers, or with bacterial quaternary compounds or with certain dithiocarbamic acid derivatives such as tetramethylthiuram disulphide. Also, carriers which themselves have favourable pharmacological properties may be used, for instance sulphur as a powder base or zinc stearate as a component of ointment bases.

The invention also provides a method of protecting an organic material susceptible to bacterial or other microbial attack which comprises treating the material with a 5-nitro-2-furfurylideneamino-oxazolidinone of Formula I. The organic material may be, for instance, a natural or synthetic polymeric material, a proteinaceous or carbohydrate substance, or a natural or synthetic fibre or textile material formed therefrom.

The invention also provides an animal feedstuff composition comprising a 5-nitro-2-furfurylideneamino-oxazolidinone of Formula I in an amount sufficient to promote the growth of the animal fed with the composition.

The following examples further illustrate the present invention. Percentages are expressed by weight unless otherwise stated.

EXAMPLE 1

To a stirred mixture of 30 grams of 5-hydroxymethyl-3 - (5 - nitrofurfurylideneamino) - 2 - oxazolidinone and 60 grams of anhydrous pyridine was added 13.2 grams of methane sulphonyl chloride. The dark brown solution was poured into 500 grams of water and the mixture was allowed to stand when the product crystallized. The yellow product was collected, washed well with water and dried.

The product was 5-methylsulphonyloxymethyl-3-(5-nitrofurfurylideneamino)-2-oxazolidinone, having a melting point of 156° C. after recrystallization from a mixture of dimethyl formamide and methanol.

EXAMPLE 2

The procedure described in Example 1 was carried out using pentane sulphonyl chloride instead of methane sulphonyl chloride, the reaction conditions being otherwise essentially the same.

The product was 3 - (5-nitrofurfurylidenamino)-5-n-pentylsulphonyloxymethyl-2-oxazolidinone.

EXAMPLE 3

(a) The procedure described in Example 1 was carried out using 3 - furfurylideneamino-5-hydroxymethyl-2-oxazolidinone instead of 5-hydroxymethyl-3-(5-nitrofurfurylideneamino)-2-oxazolidinone, the reaction conditions being otherwise essentially the same.

The product was 3 - furfurylideneamino-5-methylsulphonyloxymethyl-2-oxazolidinone.

(b) To a mixture of 10.3 grams of acetic anhydride and 1.9 grams of concentrated nitric acid was added, in portions, 2.6 grams of 3-furfurylideneamino-5-methylsulphonyloxymethyl-2-oxazolidinone while cooling. After allowing the reaction mixture to stand, the resulting yellow solid was collected and recrystallized from a mixture of dimethyl formamide and methanol.

The product was 5-methylsulphonyloxymethyl-3-(5-nitrofurfurylideneamino)-2-oxazolidinone, having a melting point of 156° and being identical with the product of Example 1.

EXAMPLE 4

Preparation of tablets 100 g. of 5-methylsulphonyloxymethyl-3-(5-nitrofurfurylideneamino)-2-oxazolidinone are mixed with 60.0 g. of maize starch and 35.0 g. of lactose, the mixture is moistened with a solution of 5.0 g. of gelatin and 3.0 g. of glycerol in 70.0 g. of water and granulated through a sieve. The granulate is mixed with a mixture of 15.0 g. of talcum, 10.0 g. of maize starch and 2.0 g. of magnesium stearate. The resulting mixture is pressed into 1,000 tablets, each containing 100 mg. of active substance. If desired, the tablets can be grooved for better adaption of the dosage.

EXAMPLE 5

Preparation of dragées (I)

Composition: For 1,000 dragées, g.
5-methylsulphonyloxymethyl - 3 - (5 - nitrofurfurylideneamino)-2-oxazolidinone _____ 100.0
Maize starch _____ 27.0
Gelatin _____ 8.0

(II)

Glycerol _____ 2.0
Distilled water q.s. ad 100 ml.
Maize starch _____ 10.0

(III)

Talcum _____ 7.0
Magnesium stearate _____ 1.0

_____
155.0

(IV)

White dragée coating:
Shellac _____ 2.0
Sugar _____ 50.0
Talcum _____ 38.0
Gum arabic _____ 7.4
Colloidal silicon dioxide _____ 2.2
Titanium dioxide _____ 0.4

Composition I is granulated in the heat with composition II through a sieve of 1.2 mm. mesh diameter. The dried granulate is mixed with composition III and the resulting mixture is pressed into 1,000 dragée cores. These are then coated with composition IV and dried. The dragées obtained weigh 255.0 mg. and contain 100 mg. of active substance.

EXAMPLE 6

Preparation of a syrup

Composition: For 1 liter, g.
5-methylsulphonyloxymethyl - 3 - (5 - nitrofurfurylideneamino)-2-oxazolidinone ____ 100.0
Colloidal silicon dioxide _____ 13.0
p-Hydroxybenzoic acid methyl ester _____ 1.4
p-Hydroxybenzoic acid propyl ester _____ 0.6
Citric acid _____ 1.0
Sodium cyclamate _____ 5.0
Distilled water _____ 610.0
Glycerol _____ 100.0
Sodium carboxymethyl cellulose _____ 4.0
Sugar _____ 320.0

_____
1155.0

The active substance and the colloidal silicon dioxide are passed through a sieve of 1.2 mm. mesh diameter (I).

The p-hydroxybenzoic acid esters, the citric acid and the sodium cyclamate are dissolved in the given amount of boiling distilled water; the glycerol is then added to this solution (II). The sodium carboxymethyl cellulose and the sugar are thoroughly mixed (III).

Composition III is then added at 75° C. to Solution II under stirring until complete dissolution of III. The viscous slightly turbid liquid is cooled to room temperature, filtered, if necessary, and mixed with composition I. Water is added to the resulting mixture up to the prescribed weight of 1,155.0 g. and the syrup obtained is homogenized.

What is claimed is:
1. A compound of the formula
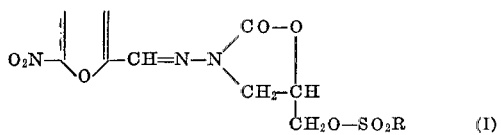
wherein R is an alkyl group containing from one to five carbon atoms.
2. The compound according to claim 1, wherein R is methyl.
3. The compound according to claim 1, wherein R is pentyl.
References Cited
UNITED STATES PATENTS
3,288,787  11/1966  Massaroli _____ 260—240
HENRY R. JILES, Primary Examiner
H. I. MOATZ, Assistant Examiner
U.S. Cl. X.R.
424—272